(12) United States Patent
Zhang

(10) Patent No.: US 9,002,923 B2
(45) Date of Patent: Apr. 7, 2015

(54) TRANSPARENT WEB PROXY

(75) Inventor: Junbiao Zhang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 686 days.

(21) Appl. No.: 12/737,257

(22) PCT Filed: Jul. 1, 2008

(86) PCT No.: PCT/IB2008/001723
§ 371 (c)(1),
(2), (4) Date: Dec. 22, 2010

(87) PCT Pub. No.: WO2010/001188
PCT Pub. Date: Jan. 7, 2010

(65) Prior Publication Data
US 2011/0119331 A1    May 19, 2011

(51) Int. Cl.
G06F 15/16    (2006.01)
H04L 29/12    (2006.01)
H04L 29/08    (2006.01)
H04L 29/06    (2006.01)

(52) U.S. Cl.
CPC ...... *H04L 61/2528* (2013.01); *H04L 29/12405* (2013.01); *H04L 63/168* (2013.01); *H04L 67/2814* (2013.01); *H04L 67/02* (2013.01)

(58) Field of Classification Search
CPC ............... H04L 29/12405; H04L 61/2528
USPC ......................... 709/202, 203, 223
See application file for complete search history.

(56) References Cited

U.S. PATENT DOCUMENTS

| | | | |
|---|---|---|---|
| 2005/0125511 A1* | 6/2005 | Hunt | 709/220 |
| 2005/0268309 A1* | 12/2005 | Krishnaswamy et al. | 719/330 |
| 2006/0136598 A1* | 6/2006 | Fischofer | 709/238 |
| 2008/0133774 A1* | 6/2008 | Rhee | 709/246 |

FOREIGN PATENT DOCUMENTS

| | | | |
|---|---|---|---|
| EP | 0909073 | 4/1999 | |
| EP | 1898580 | 3/2008 | |
| EP | 1898580 A1 * | 3/2008 | ............ H04L 12/66 |
| WO | WO-03001756 | 1/2003 | |
| WO | WO-2008075892 | 6/2008 | |

OTHER PUBLICATIONS

Chatel, "Classical Versus Transparent IP Proxies; rfc1919.txt", IETF Standard, Internet Engineering Task Force, CH, Mar. 1, 1996.
Search Report Dated April 27, 2009.

* cited by examiner

*Primary Examiner* — Hitesh Patel
(74) *Attorney, Agent, or Firm* — Vincent E. Duffy; Joel M. Fogelson

(57) ABSTRACT

Disclosed is a system and method for providing a transparent proxy for Internet communications. A filtering and redirection module receives IP requests from at least one client, reads and saves the destination of the IP requests, and rewrites the destination of the IP request to the destination of a proxy module. Upon being unable to read, or otherwise determine, a destination for an IP request, the proxy module accesses destination information about the IP request from the filtering and redirection module. The proxy module then transmits the IP request to a web server at the original destination.

22 Claims, 4 Drawing Sheets

TRANSPARENT WEB PROXY

This application claims the benefit, under 35 U.S.C. §365 of International Application PCT/IB2008/001723, filed Jul. 1, 2008, which was published in accordance with PCT Article 21(2) on Jan. 7, 2010 in English.

TECHNICAL FIELD

The present principles generally relate to handling Internet communications, and, more particularly, to a system and method for providing transparent proxy services to clients without requiring proxy-specific setup.

BACKGROUND

At the outset, it should be understood that the World Wide Web (the web) is a system of web pages linked together through hyperlinks. The protocol defined to describe how these web pages interact with each other is the Hypertext Transport Protocol (HTTP). HTTP requests and responses most commonly take the form of American Standard Code for Information Interchange (ASCII) text.

The Internet is the system over which web pages are transferred, and the protocol defining the communications used over the Internet is the Transmission Control Protocol/Internet Protocol (TCP/IP). When a party requests a web page, a TCP connection is set up between the requesting party as a client and a server that will help deliver such a web page. HTTP requests and responses are then transmitted within Internet protocol (IP) requests over the established TCP connection.

The use of wireless networking for Internet communications has become more pervasive. Frequently, providers of wireless Internet access turn to wireless "hotspots" to service users instead of using wired Internet connections which require an Ethernet connection. However, for security and network stability purposes, wireless providers commonly need to monitor the network traffic coming through the wireless hotspot.

Most commonly, monitoring of network traffic at the network level is accomplished though the use of a proxy. A proxy sits at the boundary of a network and aggregates and accepts connections from users within the network, manages the connections, and then creates a connection to each website or Internet destination requested by each user. In doing this, a proxy acts to the outside world as if it is making the website request instead of having a user's computer facilitate such a request directly. A responding website then communicates to the proxy, which then communicates to the client.

Frequently, in corporate environments, network administrators enforce network usage policies, bandwidth throttling, network or security measures or the like using proxies. Additionally, network administrators can take advantage of the proxy's ability to aggregate many user requests into one outgoing Internet Protocol (IP) address. More specifically, when a network is only assigned a limited number of network addresses, a proxy can send requests from multiple clients from a single IP address. Since each IP request is independent of the others, even if on a single IP address, the proxy need only keep track of which connection belongs to which client.

Additionally, proxies are commonly used for access control and to enforce network usage policies. Since all network traffic goes through a proxy prior to being transmitted to the Internet, a proxy is an ideal centralized place to monitor the activity of network clients. Content filters and activity tracking software are commonly installed on a proxy to record traffic from each client, or to refuse requests for sites that violate the network's acceptable use policy. Similarly, access control software can be installed at the proxy that prevents clients from accessing the Internet until a fee is paid, a user's information is authenticated, or the like.

However, the user of larger networks within the proxy's domain, and the use of encryption technologies such as Secure Socket Layer (SSL) and Hypertext Transport Protocol (Secured) (HTTPS) have complicated the use of network proxies. Ideally, a proxy setup will be transparent without any user intervention or setup being required. For service providers charging for Internet access through wireless hotspots, the ability for a user to access the Internet without configuring a web browser is critical. In some cases, it can be practical for a user to manually configure proxy settings, but in the case of a user roaming to hotspot to hotspot, setting proxy settings for each hotspot is impractical at best.

SUMMARY OF THE INVENTION

The present principles propose a system and method for providing transparent proxy services for Internet communications, and allowing the use of non-addressed packets or packets with overwritten destinations to be handled by a proxy without any client configuration.

According to one aspect, the present principles of transparent proxy service are achieved by a system comprising at least one filtering and redirection module configured to accept an Internet Protocol (IP) request from at least one client, each IP request including at least one packet, each packet including at least one destination address. The system can further include at least one proxy module in communication with the filtering and redirection module. The filtering and redirection module is further configured to read and save IP request information associated with the IP request, and redirect the IP request to the proxy module. The proxy module accesses the IP request information and transmits the redirected IP request to a web server using the IP request information.

The filtering and redirection module can optionally include an address table, and can be configured to save the IP request information relating to the IP request to the address table. The IP request information can include a source address of the IP request, a source port of the IP request, a destination address of the at least one IP request, and a destination port of the IP request, and can also further optionally include a reference to the IP request.

The system can include the proxy requesting the IP request information from the filtering and redirection module upon receiving at least one packet without destination address information, or can optionally include the filtering and redirection module transmitting the IP request information to the proxy module upon redirecting at least one packet.

The advantages, nature, and various additional features of the present principles will appear more fully upon consideration of the illustrative implementations to be described in detail in connection with accompanying drawings.

BRIEF DESCRIPTION OF THE DRAWINGS

In the drawings, wherein like reference numbers denote similar components throughout the views.

Figure 1:
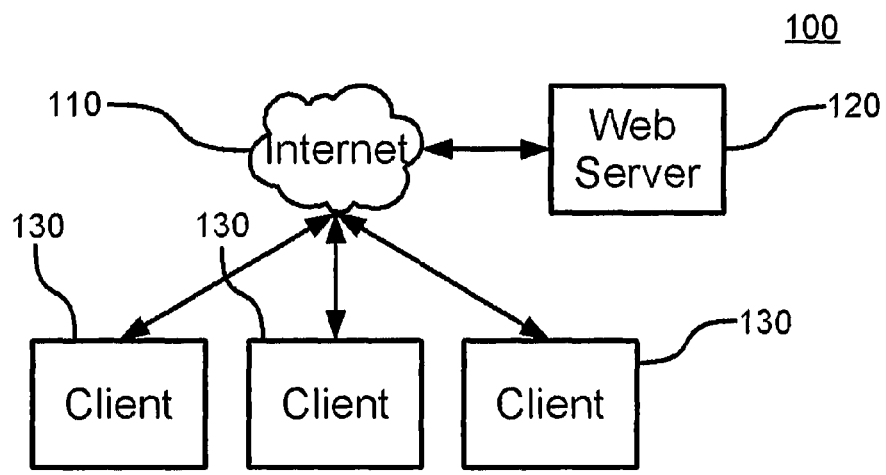
FIG. 1 is a diagram of an exemplary direct. Internet communication system.

It should be understood that the drawings are for purposes of illustrating the concepts of the present principles and are not necessarily the only possible configuration for illustrating the present principles.

DETAILED DESCRIPTION

The language of the detailed description uses the term "browser" as a program that is meant to be a computer program that is used to have a computer render web pages written in HTML or other type of computer based mark up language, where such code is delivered over a wireless or wired connection to a communication network. It is also to be understood that a term browser program represents an example of a type of computer program that can be configured in order to operate with a server over a communications network. That is, the principles for configuring a browser for communication also apply when configuring other computer programs such a media players, games, applications, and the like, which can require the interfacing with a server or another device through a computer network.

The term "request" is meant to be a term which represents a request for a resource which is obtained through a communication network, such as the Internet. The specification also uses the term "web based resource" which represents items such as web pages, web sites, streaming audio, streaming video, games, computer files, audio files, video files, text documents, and the like which can be requested and accessed through a communications network using address information as a uniform resource indicator such as a uniform resource locator or an Internet protocol address using Internet Protocol v. 4 or Internet Protocol v. 6 naming conventions. A web browser is typically the means which is used to access such web based resources, but other networking modalities can be used in accordance with the embodiments described herein. Additionally, an uniform resource locator is resolved into a numeric Internet Protocol address as address information by using a domain name server.

It is also to be understood that the present principles described herein are in relation to data transmissions over the Internet. Such principles can advantageously be applied to form of data transmissions using a communications network. In addition, the present principles are applicable to any data transmission system used by a computer, telephone, set top box, satellite link, and the like.

It should be understood that the elements shown in the Figures can be implemented in various forms of hardware, software or combinations thereof. Preferably, these elements are implemented in a combination of hardware and software on one or more appropriately programmed general-purpose devices, which can include a processor, memory and input/output interfaces.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor to furthering the art, and are to be construed as being without limitation to such specifically recited examples and conditions.

Moreover, all statements herein reciting principles, aspects, and implementations of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative modules embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor or element, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any networks, switches, routers, or decision blocks shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Three types of proxy configurations can be used when setting up a browser for a client. The first approach, automatic proxy discovery, operates by having a browser on a client device use standard network protocols to discover a particular proxy configuration for a network. A second approach called, explicit proxy configuration, requires a user to manually enter a proxy configuration in a browser, with a different proxy configuration needed for each network or hotspot. The third approach, no-configuration setup, allows a user to connect to a proxy without requiring the user to manually enter proxy information, and without requiring a browser that supports automatic proxy discovery. That is in this third approach, the browser will operate with a proxy without reconfiguring the settings of the browser.

Most Internet communications utilize connection which comply with the command structure called Hypertext Transport Protocol (HTTP) which is used to request and deliver Internet content to users. Furthermore, most HTTP requests include headers in the text of a request, where such information regarding the destination of the request is inserted as a header when a browser is configured to use a proxy. Additionally, HTTP requests are then encapsulated in IP packets for transport to a client or server.

A HTTP (secured mode) (HTTPS) transmission is an alternative protocol to HTTP where an HTTPS transmission uses transport layer Secured Socket Layers (SSL) encryption for provide end-to-end security between a server and a client. A HTTPS transmission prevents any intermediate proxies from reading any of the actual transmitted content, including the HTTP headers when such a request is communicated between parties. When a browser is configured to use a proxy server, the browser first sends an extra HTTPS request directed specifically to the proxy specifying the HTTPS server. This allows the proxy to establish two Transmission Control Protocol (TCP) connections, one from the client to the proxy, and one from the proxy to the destination server. The proxy then blindly forwards the HTTPS traffic from the client between these two connections, where a proxy is not able to read the encrypted content transmitted over such connection.

A transparent proxy can involve two components, the packet filtering and redirection module (hereinafter, the redirection module) and the proxy module itself. The redirection module is commonly located on a gateway device which handles all outgoing web traffic. The redirection module intercepts IP packets having HTTP and HTTPS data, and rewrites the IP packet headers of the packets, changing the IP headers to the local proxy server's IP address. However, since there is only a single destination address in the IP packet, the original destination of the packet is lost. Thus, when a client recognizes that it is interacting with a proxy, the client has to set the header information inside the IP packet, in the HTTP headers. In many cases, however, a client or proxy does not know when to set the header information inside an IP packet because the client or proxy either does not recognize the need to set an HTTP header, or a data packet is encrypted as HTTPS traffic where the client/proxy receiving such a data packet cannot access the contents of the data packet. Proxies are known in the prior art for prohibiting more than one request/response over a single, persistent HTTPS connection. Therefore, there is a possibility that a proxy will not have access to the destination of a packet that has been redirected to the proxy, where the packet destination headers having been overwritten. Hence, the proxy cannot correctly direct a packet to the proper destination.

Accordingly, the present principles provide a system and method for monitoring proxy traffic and permitting a proxy to transparently handle network traffic not specifically configured for a proxy.

Referring to FIG. 1, an exemplary direct Internet communication system 100 is depicted. In such a system 100, a plurality of clients 130 make network connections to a web server (server) 120 through the Internet 100. Client 130 connect to server 120 by establishing a TCP connection, and then transmitting an HTTP request encapsulated in an Internet protocol (IP) request to the server 120 over the established TCP connection. The server 120 then replies by sending a HTTP response back over the TCP connection.

Figure 2:
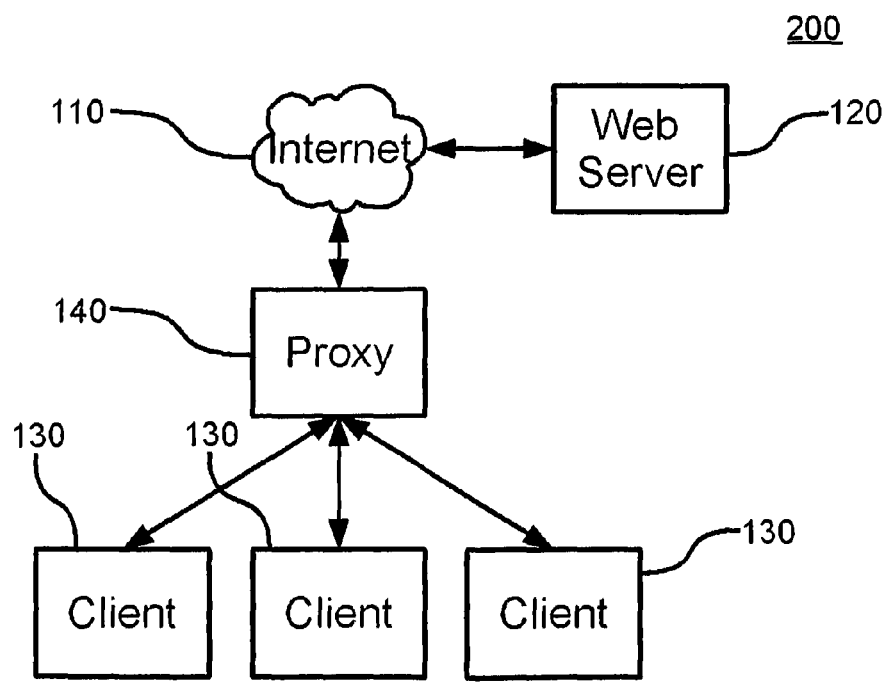
FIG. 2 is a diagram of an exemplary proxy Internet communication system.

Referring to FIG. 2, a diagram of an exemplary proxy Internet communication system 200 is depicted. In system 200, a plurality of clients 130 connect to a proxy module 140. Proxy module 140 then maintains a first TCP connection to client 130. The proxy module 140 also creates a second TCP connection through the Internet 110 to server 120. The proxy module 140 then maintains both TCP connections, passing responses from the server-proxy connection to the proxy-client connection, and passing requests from the proxy-client connection to the server-proxy connection.

Figure 3:
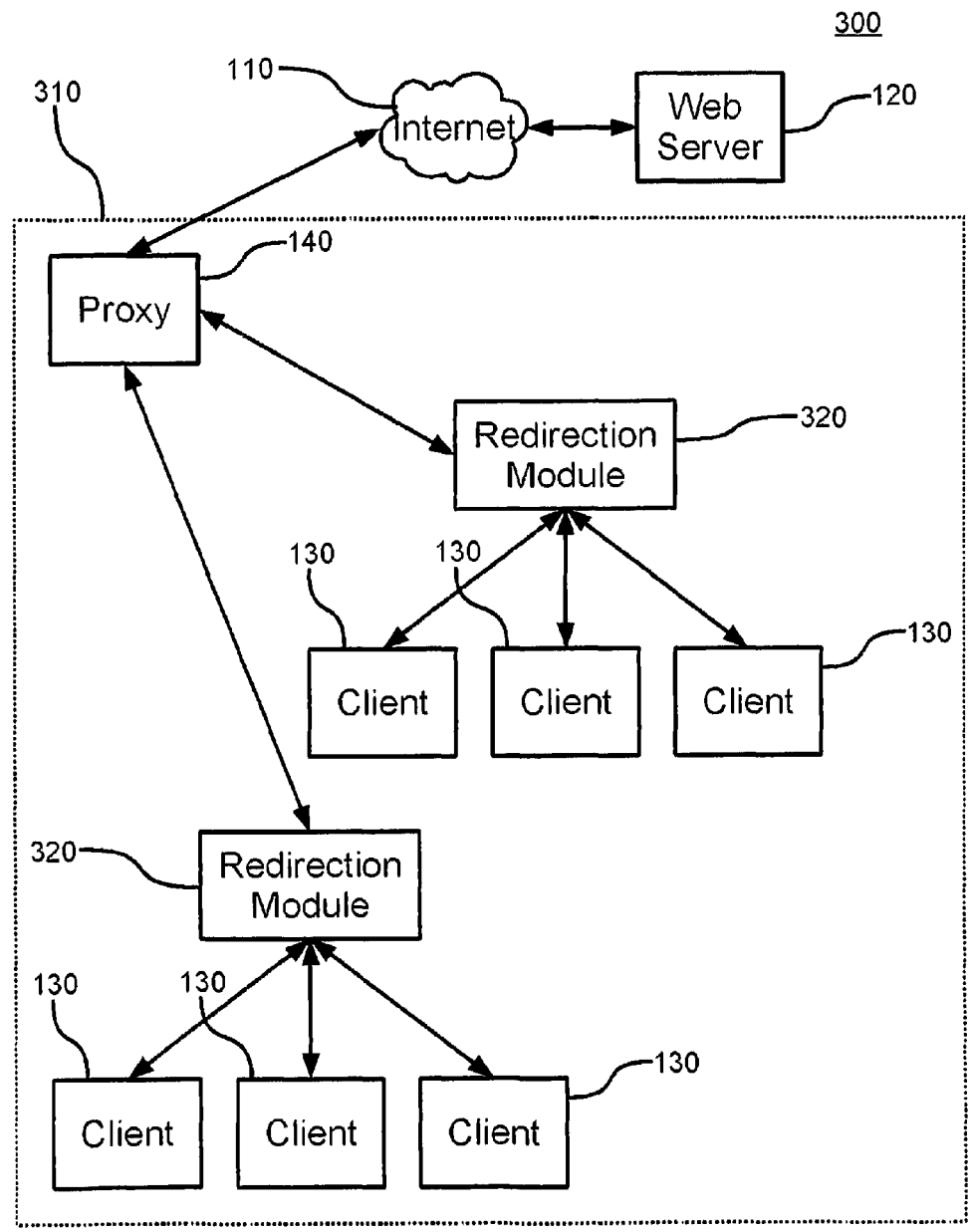
FIG. 3 is a diagram of a transparent proxy Internet communications system, in accordance with an implementation of the present principles.

Referring to FIG. 3, a diagram of a transparent proxy Internet communications system 300 in accordance with an implementation of the present principles is described. For system 300, a plurality of clients 130 can be disposed within a local area network (LAN) 310. While a LAN 310 describes one implementation of a communications network, skilled artisans will recognize that the present principles can be applied to any network topography, and particularly in implementations where a specifically delineated boundary is desired between a client 130 and the rest of an external communication network such as the Internet. For example, where a wireless hotspot access provider sells wireless Internet access, system 300 can be limited to the hotspot, with a proxy regulates traffic in and out of the hotspot.

A proxy module 140 and a plurality of redirection modules 320 can also be disposed on the LAN 310. In one preferred implementation, each redirection module 320 can be advantageously disposed in the LAN 310 such that a client 130 connects to the redirection module 320. For example, a redirection module 320 can be disposed on a router, hub or the like, such that a client 130 or a plurality of clients 130 connect to the Internet 110 through the redirection module 320. In another embodiment, a redirection module 320 is disposed at the proxy, as to manage incoming connections, perform packet filtering and other communication functions.

Each redirection module 320 can also connect to the proxy module 140, which, in turn, connects to Internet 110. The proxy then communicates to a server 120 through the Internet 110. In one implementation, the proxy module 140 operates as an edge device handling all traffic out of, and into, the local area network. For example, proxy module 140 can be disposed on a single, purpose-built gateway such as a router or hub. However, in an alternative embodiment, proxy module 140 can be disposed on a general purpose computing device such as a server, desktop computer, or the like. Disposing a proxy module 140 on such a general purpose computer allows for various security and management software such as virus scanners, bandwidth throttling software, web usage monitoring software and the like to be disposed in a manner to monitor traffic through the proxy module 140.

When a client 130 makes a request to communicate to a server 120, the request is initially communicated to redirection module 320. In one implementation, the redirection module 320 records the initial destination of the request sent by the client 130, and then overwrites the destination of the request as to make the destination of the request the address corresponding to that of the proxy module 140. The redirection module 320 then communicates the original destination address to the proxy module 140 without prompting, while the request itself is redirected to proxy module 140. Hence, proxy module 140 will have both the request and information corresponding to the original destination of such a request.

The proxy module 140 can also communicate with the redirection module 320 as to request the original destination address from the initial connection that was overwritten in the packets by redirection module 320. Proxy module 140 uses the original address to send any additional packets to the requested destination. Thus, in one embodiment, proxy module 140 can maintain a connection beyond where the proxy would normally not be able to support multiple requests over a persistent connection where the proxy module would typically be limited to a connection from client 130 to redirection module 320.

Figure 4:
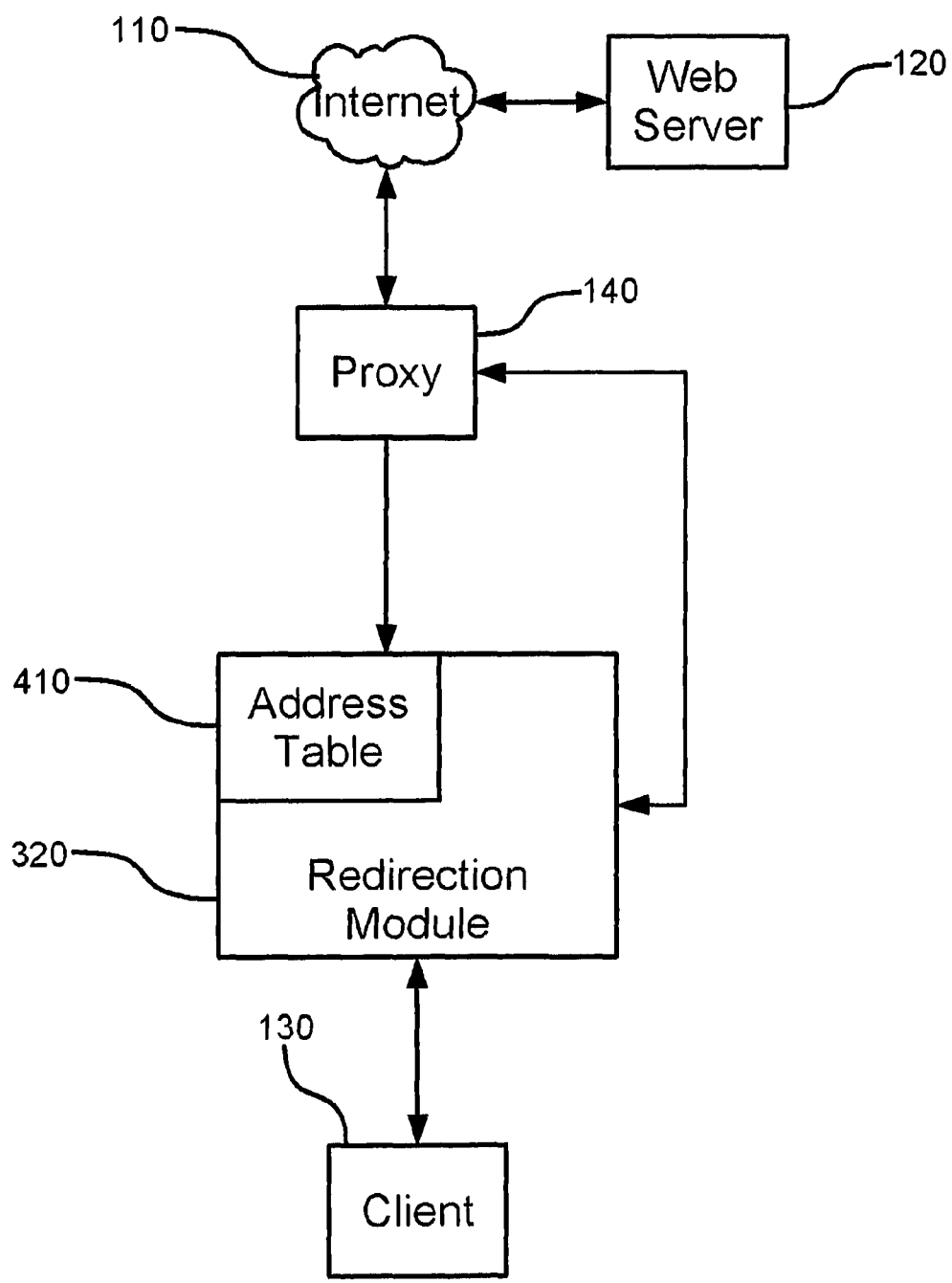
FIG. 4 is a detailed diagram of a transparent proxy Internet communications system, in accordance with an implementation of the present principles.

Referring to FIG. 4, a detailed diagram of a transparent proxy Internet communications system, in accordance with an implementation of the present principles, is depicted. When a client 130 request is received by the redirection module 320, information regarding the request is entered into an address table 410. In one embodiment, redirection module 320 can store information such as the source address and port, and the actual destination address and port associated with a particular connection from client 130. In another embodiment, the redirection module 320 can also store in the address table 410 a reference to each particular connection such that the proxy module 140 can reference the address table 410 using the connection reference to obtain any additional information required by the proxy module 140. For example, redirection module 320 can store in the address table 410 an index or identification number associated with each connection established with module 320.

In one embodiment, the proxy module 140 creates a connection to the redirection module 320 to read the address table 410 if the destination information of received packets appears to be in error or corrupted. The intended destination of such packets can be indeterminate due to the encryption of address information in an HTTPS packet, or the address information in a packet is overwritten by redirection module 320. Thus, when the proxy module 140 receives unaddressed packets, or packets with an unreadable destination address, the proxy module 140 can initiate the separate connection to the redirection module 320. For example, upon receiving a redirected packet where the destination was overwritten with the address of the proxy module 140, the proxy module 140 can initiate a TCP connection to the redirection module 320 requesting the destination information for the packet that the proxy has received and needs to forward. Accordingly, the redirection module 320 can provide the destination information on the appropriate connection in a response to the proxy module 140. Additionally, any of the information stored, provided or requested for each connection by the redirection modules 320 or proxy module 140 can be stored, provided or requested for each request as well.

Alternatively, the redirection module 320 initiates a separate connection to the proxy module 140 from the TCP connection used to transmit the request from client 130. Therefore, the redirection module 320 can transmit information when each packet is redirected to the proxy module 140.

In another embodiment, the redirection module 320 appends or otherwise adds additional information indicating the destination to each packet as the destination address is overwritten. For example, the redirection module 320 can add a field of to the beginning or end of each packet containing destination information, which the proxy module 140 can remove before forwarding the packet over the Internet 110.

Figure 5:
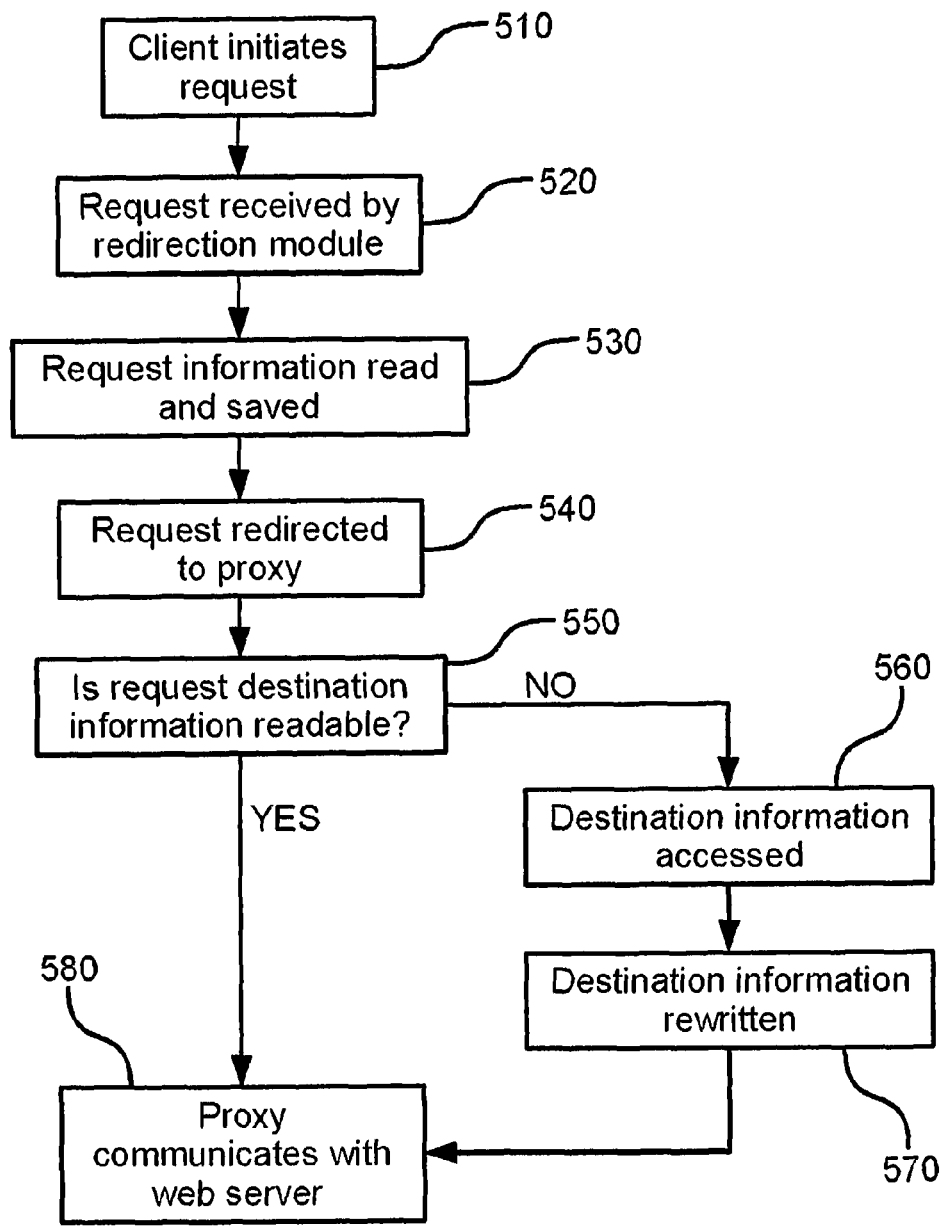
FIG. 5 is a block flow diagram illustrating a method for providing transparent proxy Internet communications, in accordance with an implementation of the present principles.

Referring to FIG. 5, a block flow diagram illustrating a method for providing transparent proxy Internet communications, in accordance with an implementation of the present principles, is described.

Initially, a client 130 initiates a request in step 510. In one implementation of step 510, a user initiates a request for a web based resource by entering a web address into a browser operated by client 130. The client 130 then transmits the request over a network connection, where the request is received by a redirection module 320 in step 520. Information regarding the request is then read and saved in step 530. In one implementation, the request information is read and then saved in address table 410 disposed within the redirection module 320. The address table 410 can store the request information in any manner required or desired for the particular network architecture on which the system 500 is disposed.

That is, the address table 410 can store request information in a sorted manner, allowing, for example, a binary search algorithm to be employed for subsequent lookups. Alternatively, in another embodiment, the request information can be stored in an unsorted manner, allowing a sequential search algorithm to be employed for subsequent lookup requests. Additional variations of how address information is organized in address table 410 can be employed for optimizing a search for address information including: indexing, hash tables, fixed length record addressing, and the like.

The client initiated request is then redirected to the proxy in step 520. In one implementation, the redirection module 320 in step 520 overwrites the destination address of the request with the address of the proxy module 140, and module 320 then transmits the readdressed request over a network 310, where the request is eventually routed to proxy module 140.

Upon receiving the client request, the proxy 140 determines in step 550 whether the destination information in the request is readable. In one implementation, the proxy module 140 can attempt to read the destination of the request from the TCP packets. However, for requests where the redirection module 320 overwrote the destination to redirect the client request to proxy module 140; the destination address present will be that of the proxy module 140 instead of the address of a web resource in the client request. The proxy module 140 can attempt to read headers in the HTTP content of the request. Where the client 130 did not set the destination address for use with a proxy, or where the content of the request is encrypted, the proxy will then be unable to read the destination information from the client request itself.

Should the proxy module 140 determine, in step 550, that the request's destination information is not readable, the proxy 140 can access the destination information stored at the redirection module 320. In one embodiment, proxy module 140 will initiate and connection and obtain destination information from redirection module 320, if the destination information in the client request cannot be read. Similarly, the proxy module 140 can have a listening module, or the like, employed to receive broadcasted destination information from redirection module 320, where the proxy module 140 can associate destination information in the listening module with a request upon determining that the request information was unreadable. This broadcasted destination information is transmitted without prompting from the proxy module 140, but rather is used when the redirection module 320 changes the destination information in a request for a resource. The proxy module 140 then can use the broadcasted destination information to forward along a client's request for a web resource.

Having accessed the destination information for a request in step 560, the proxy module 140 can use the destination information to overwrite the destination address of the request in step 570, and then communicate the request to the web server at the original destination address in step 580.

Conversely, should the proxy module 140 determine in step 550 that the destination information is readable, the proxy module 140 communicates the request to the web server normally in step 580.

Having described various embodiments for a system and method for implementing a transparent proxy (which are intended to be illustrative and not limiting), it is noted that modifications and variations can be made by persons skilled in the art in light of the above teachings. It is therefore to be understood that changes can be made in the particular implementations of the present principles disclosed which are within the scope and spirit of the present principles as outlined by the appended claims. Having thus described the present principles with the details and particularity required by the patent laws, what is claimed and desired protected by Letters Patent is set forth in the appended claims.

The invention claimed is:

1. A system for providing a proxy for a network, the system comprising:
   at least one redirection module for communicating with at least one client and for accepting a request from said at least one client for a resource, said request comprising at least one data packet including address information; and
   at least one proxy module for communicating with said at least one redirection module; and
   said at least one redirection module being configured to read and save address information in said request, to redirect said request to said at least one proxy module, and to add a field to the beginning or end of a packet that is redirected, said field containing destination information;
   wherein the at least one proxy module accesses address information from said redirection module and transmits the redirected request to a server corresponding to said resource using accessed destination information.

2. The system of claim 1, wherein the at least one redirection module further comprises an address table, and is further configured to save the address information of the request, where said address information comprises an Internet Protocol address.

3. The system of claim 2, wherein the address information includes:
   a source address of the at least one client;
   a source port of the at least one client;
   a destination address of the requested resource; and
   a destination port of the requested resource.

4. The system of claim 1, wherein the at least one proxy module requests the address information from the at least one redirection module upon receiving at least one packet without destination address information.

5. The system of claim 1, wherein the at least one redirection module transmits address information to the at least one proxy module upon redirecting said at least one packet.

6. A system for providing a proxy for a network, the system comprising:
   at least one filtering and redirection module in communication with at least one client and at least one proxy module and configured to accept at least one Internet Protocol (IP) request from the at least one client, each of said at least one IP request including at least one packet, said at least one packet including at least one destination address; and
   an address table disposed within the at least one filtering and redirection module, wherein said at least one filtering and redirection module is further configured to read and save IP request information associated with the at least one IP request to the address table, redirect the at least one IP request to the at least one proxy module, and to add a field to the beginning or end of a packet that is redirected, said field containing destination information.

7. The system of claim 6, further comprising:
   at least one proxy module in communication with the at least one filtering and redirection module and configured to accept the at least one redirected IP request, access IP request information relating to the at least one IP request and transmit the at least one redirected IP request to a web server using the IP request information.

8. The system of claim 6, wherein the IP request information includes:
   a source address of the at least one IP request;
   a source port of the at least one IP request;
   a destination address of the at least one IP request; and
   a destination port of the at least one IP request.

9. The system of claim 6, wherein the IP request information further includes a reference to the at least one IP request.

10. The system of claim 6, wherein the at least one proxy module requests the IP request information from the at least one filtering and redirection module upon receiving at least one packet without destination information.

11. The system of claim 6, wherein the at least one filtering and redirection module adds destination information to the at least one packet prior to redirecting the at least one packet.

12. A method that provides a proxy in a network, comprising:
   using at least one redirection module to communicate with at least one client and to accept a request from said at least one client for a resource, said request comprising at least one data packet including address information; and
   using at least one proxy module to communicate with said at least one redirection module; and
   configuring said at least one redirection module to read and save address information in said request, to redirect said request to said at least one proxy module, and to add a field to the beginning or end of a packet that is redirected, said field containing destination information;
   wherein the at least one proxy module accesses address information from said redirection module and transmits the redirected request to a server corresponding to said resource using accessed destination information.

13. The method of claim 12, wherein the at least one redirection module further comprises an address table, and is further configured to save the address information of the request, where said address information comprises an Internet Protocol address.

14. The method of claim 12, wherein the address information includes:
   a source address of the at least one client;
   a source port of the at least one client;
   a destination address of the requested resource; and
   a destination port of the requested resource.

15. The method of claim 12, wherein the at least one proxy module requests the address information from the at least one redirection module upon receiving at least one packet without destination address information.

16. The method of claim 12, wherein the at least one redirection module transmits address information to the at least one proxy module upon redirecting said at least one packet.

17. A method that provides a proxy in a network, comprising: communicating with an at least one client and at least one proxy module using a redirection module that is configured to accept at least one Internet Protocol (IP) request from the at least one client, each of said at least one IP request including at least one packet, said at least one packet including at least one destination address; and disposing an address table within the at least one filtering and redirection module, wherein said at least one filtering and redirection module is further configured to read and save IP request information associated with the at least one IP request to the address table, redirect the at least one IP request to the at least one proxy module, and to add a field to the beginning or end of a packet that is redirected, said field containing destination information.

18. The method of claim 17, further comprising: using the at least one proxy module to communicate with the at least one filtering and redirection module and said at least one proxy module is configured to accept the at least one redirected IP request, access IP request information relating to the at least one IP request and transmit the at least one redirected IP request to a web server using the IP request information.

19. The method of claim 17, wherein the IP request information includes: a source address of the at least one IP request; a source port of the at least one IP request; a destination address of the at least one IP request; and a destination port of the at least one IP request.

20. The method of claim 17, wherein the IP request information further includes a reference to the at least one IP request.

21. The method of claim 17, wherein the at least one proxy module requests the IP request information from the at least one filtering and redirection module upon receiving at least one packet without destination information.

22. The method of claim 17, wherein the at least one filtering and redirection module adds destination information to the at least one packet prior to redirecting the at least one packet.

* * * * *